United States Patent Office 3,322,386
Patented May 30, 1967

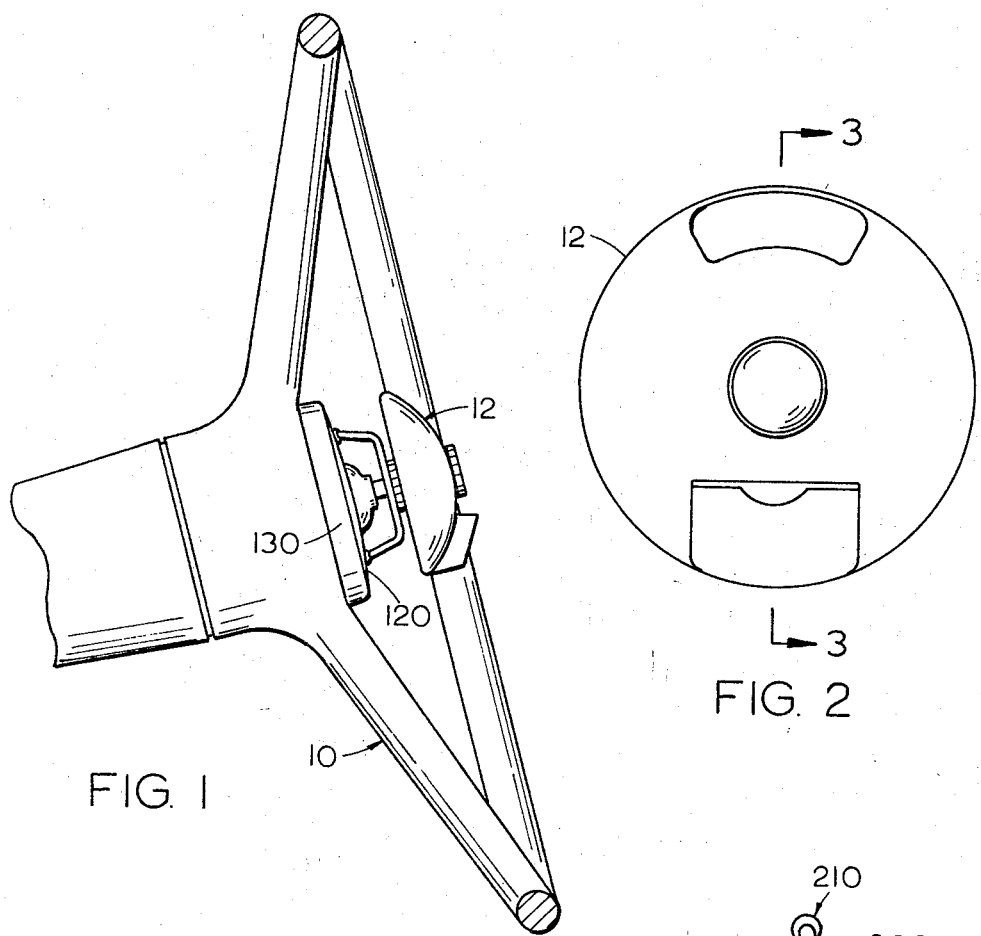
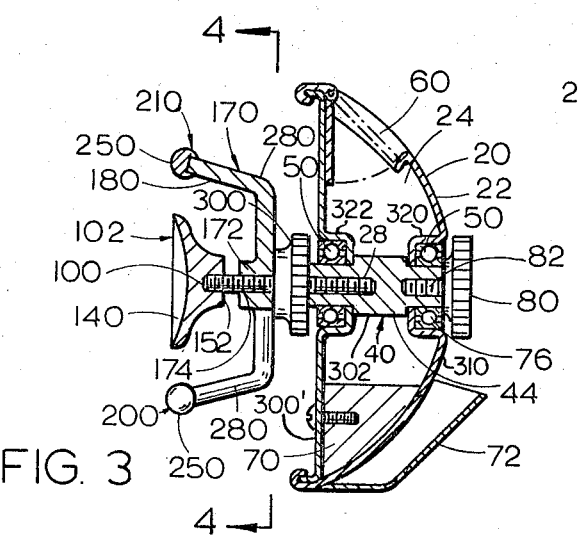

3,322,386
ROTARY AUTO ASH TRAY
Ralph F. Kunkle, Jr., 11114 Westover Road,
Omaha, Nebr. 68154
Filed May 10, 1965, Ser. No. 454,378
4 Claims. (Cl. 248—206)

This invention relates to ash trays of the type which are mounted on the hub of a steering wheel of an automobile and more particularly it is an object of this invention to provide means for fastening such an ash tray to the steering wheel hub in a manner which is rapid and convenient for making more popular the positioning of an ash tray on a steering wheel hub to gain the advantages of safety.

Automobile drivers who smoke have had the frequent experience of having an emergency arise in the split second while their eye is taken off the road in order to place cigarette ashes in a cigarette ash tray in an area of an automobile remote from the driver's position at the steering wheel.

It is, therefore, an object of this invention to provide convenient means to emplace an ash tray on the steering wheel by means of a suction cup. Suction cups have had the disadvantage that the suction soon becomes broken when they are used to support an article of any considerable weight under the high vibration conditions in an automobile.

It is, therefore, an object of this invention to provide a stabilizing assembly to be placed in a position for giving assistance to a suction cup in the support of a shaft protruding outwardly from the suction cup, whereby relatively heavy articles such as an ash tray can be carried on such a shaft without causing the cup to be disconnected.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 1 is a side elevation of a steering wheel of an automobile shown with the forward portion of the outer ring thereof removed and showing the rotary ash tray of this invention which, with its suction cup and stabilizer, is mounted thereon.

FIGURE 2 is a rear elevation of the ash tray of this invention.

FIGURE 3 is a sectional view taken along the line 3—3 of FIGURE 2.

FIGURE 4 is a sectional view taken along the line 4—4 of FIGURE 3.

Referring to FIGURE 1 for a more particular description, an automobile steering wheel is there shown at 10 having the ash tray assembly of this invention mounted thereon as shown at 12, the assembly comprising an ash tray 20 in the form of a container having an outer housing 22 and a hollow interior 24.

An approximately horizontal axle shaft 28 is provided and means for rotatably mounting the ash tray 22 on the axle shaft 28 are generally indicated at 40 comprising a spacing member or spacer 44 threadedly received on a rearward end of the axle shaft 28, the spacing member or spacer 44 having bearing assemblies 50 mounted thereon and spaced apart from the ash tray housing 22 and the spacer 44, whereby the ash tray housing 22 is freely rotatable on the bearing assemblies with respect to the spacer 44 so that an opening 60 in the upper side of the housing 22 is at all times in an upper position because of the greater weight of those portions of the ash tray which are disposed beneath the axle 28, such greater weight being assured, if necessary, by the emplacement of a weight 70 in the housing, although extra weight to the bottom of the housing can also be provided by a match-receiving well 72 attached to the lower side of the housing 22.

The ball-bearing assemblies 50 are two in number and the rearward one of the assemblies 50 is shown at 76 and is held in place by a knob 80 having a bolt 82 attached thereto and threadedly received in the spacer 44.

The axle 28 can also be called a threaded shaft 28 and it extends forwardly from a threaded connection to the spacer 44 to a point at which its forward end 100 is embedded and thereby attached to a suction cup 102 suitable for gripping an approximately smooth surface such as the rearward surface 120 of the hub 130 of the steering wheel 10.

The suction cup 102 has a concave forward gripping side 140, as is conventional, and also a rearward side 152.

The rearward end of the threaded shaft 28 extends away from the rearward end of the suction cup 102 and a stabilizer 170 is provided having a hub 172 which has a threaded opening 174 therethrough threadedly receiving the threaded shaft 28.

The stabilizer 170 further has a surface-engaging member 180 mounted on the hub 172 and having at least one surface-engaging portion disposed adjacent the concave side of the suction cup 102, whereby the rotation of the stabilizer 170 along the shaft 28 after the suction cup has been attached to a surface as the surface 120, will place the surface-engaging portion 200 in engagement with the surface 120, and inasmuch as the surface-engaging portion 200 is sufficiently rigid as to assist the suction cup 102 in supporting the shaft 28, the suction cup is less likely to be broken loose.

Extra surface-engaging portions 210 are provided in sufficient and serve a purpose later described. As best seen in FIGURE 4, a preferred number of surface-engaging portions is three with the surface-engaging portions being spaced about the outer side of the suction cup 102 at sufficient points as to tend to assist the suction cup in supporting the shaft 28 effectively, the surface-engaging portions 200 or 210 being equidistantly spaced apart preferably about the shaft 28.

Each surface-engaging portion comprises a tip 250 which is formed of resilient material so as not to scratch a surface against which it might engage and can comprise a leg 280 which, as best seen in FIGURE 3, has a concave forward side 300 in order to receive the suction cup 102 thereunder.

In operation, the suction cup is put in place and then the stabilizer is rotated forwardly on the threaded shaft 28 until it touches the same surface, thereafter a positioning knob 300 can be rotated in tight engagement with the hub 172 of the stabilizer for preventing the stabilizer from rotation thereafter. It will be seen that the axle shaft 28 and spacer 44 together form an axle 302.

If desired, the connection between the threaded shaft 28 and the spacer 44 can be not of a threaded nature, but a slidable fit, whereby the ash tray can be removed from the shaft 28 for convenient dumping of contents, the knob 80 being easily gripped and easily removed for this purpose.

It will be seen that if the surface-engaging portions 200 and 210 are at least three in number, or more as desired, and if the surface-engaging portions are spaced about the suction cup sufficiently, then an effective construction is achieved in which always at least one of the surface-engaging portions will be disposed below the shaft 28.

Also then the structure is capable of resisting other forces tending to dislodge the suction cup apart from the force of gravity.

It will be seen that the housing 22 has a forward wall 300' and a rearward wall 310, the forward wall being straight on its forward side, the rearward wall 310 being generally convex on its outer or rearward side.

The walls 300' and 310 each have a portion 320 or 322 respectively abutting the exterior of the ball-bearing assemblies 50 respectively, the portions 320 and 322 extending forwardly from the rearward wall 310 and rearwardly from the forward wall 300 respectively in directions horizontal and transverse of the remainder of the respective rearward or forward wall.

It will be seen that the axle 302 extends through the rearward side wall 310 of the housing and a removable knob 80 is larger than the adjacent end of the axle 302 and laps the adjacent bearing means 50 on the axle 302 for retaining the bearing means on the axle.

As thus described, this invention is believed to have provided both an ash tray and a new combination of stabilizer and suction cup, as a separate article of manufacture, both of which fulfil respective objectives above set forth.

From the foregoing description, it is thought to be obvious that a rotary auto ash tray constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

1. In combination: an ash tray, having a housing provided with spaced forward and rearward sides, an axle extending through said forward side of said housing, means rotatably mounting said spaced forward and rearward sides on said axle for the rotation of said housing about said axle with at least portions of the weight of said housing being carried by said axle at said forward and rearward walls, and means for attaching said axle to the steering wheel of an automobile.

2. The combination of claim 1 in which said means mounting said housing walls on said axle comprise bearings disposed between said housing walls and said axle.

3. The combination of claim 1 in which said means mounting said housing walls and said axle comprises bearing means disposed between said housing walls and said axle, said housing forward and rearward walls each having a portion abutting the exterior of said bearing means which is disposed extending transversely to the remainder of the respective forward or rearward wall.

4. The combination of claim 1 in which said axle extends through the rearward side wall of said housing, and in which a removable knob is threadedly secured to the rearward end of said axle, said knob being larger than the adjacent end of said axle and lapping the adjacent bearing means on said axle for retaining said bearing means on said axle, said means for attaching said axle to the steering wheel of an automobile comprising: said axle being in sections, a forwardmost one of said axle sections being removably and slidably attached to the adjacent axle section whereby disconnection between said slidably connected axle sections will permit removal of said housing for emptying.

References Cited

UNITED STATES PATENTS

| | | | |
|---|---|---|---|
| 952,495 | 3/1910 | Austin | 248—206 |
| 2,646,164 | 7/1953 | Mermelstein | 206—19.5 |
| 2,683,527 | 7/1954 | Kozeliski | 206—19.5 |

FOREIGN PATENTS

| | | |
|---|---|---|
| 1,016,325 | 12/1952 | France. |
| 335,981 | 10/1930 | Great Britain. |

CLAUDE A. LE ROY, *Primary Examiner.*

J. F. FOSS, *Assistant Examiner.*